UNITED STATES PATENT OFFICE.

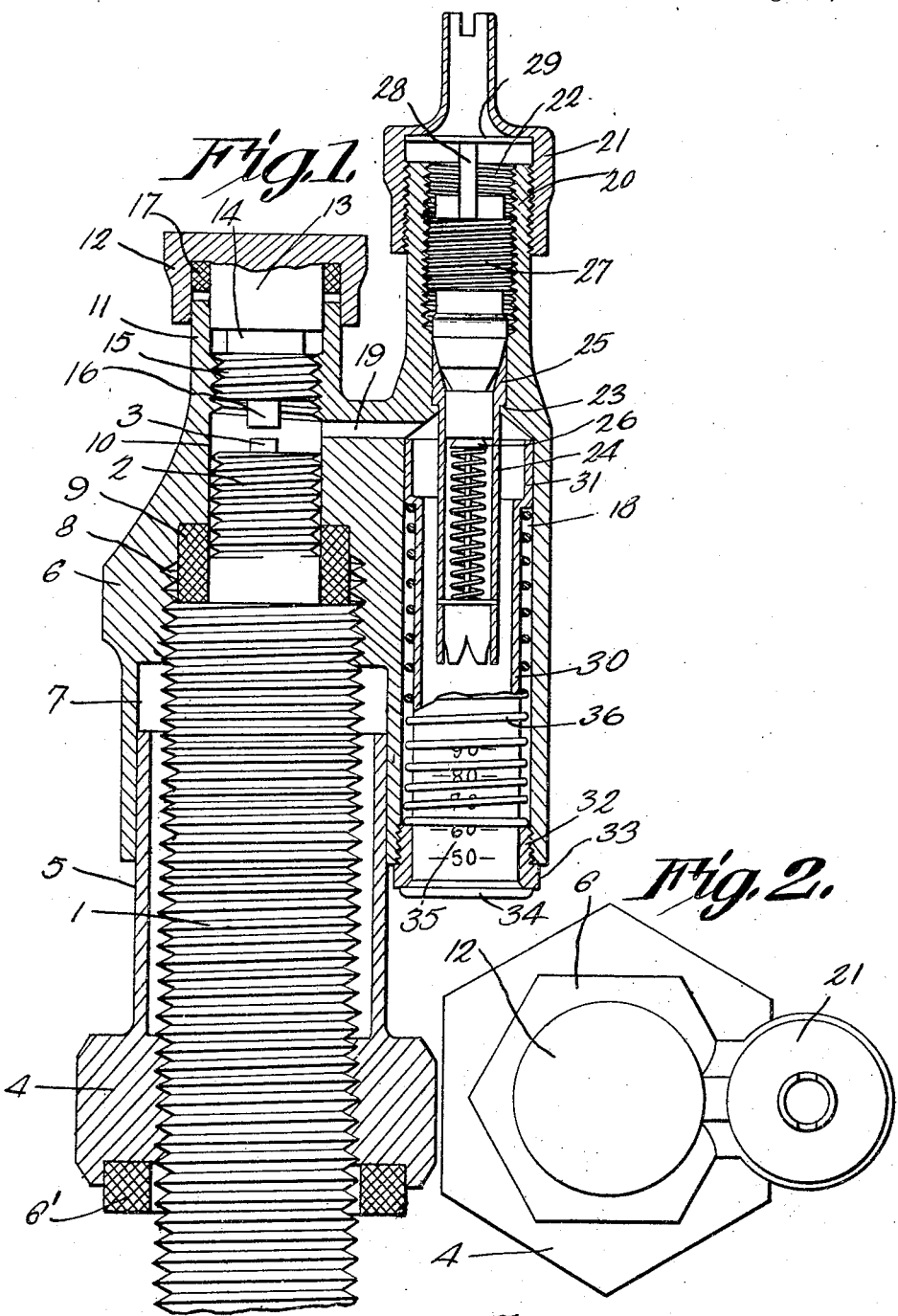

SHERMAN S. BENSON, OF YORK, NEBRASKA.

AIR-PRESSURE GAGE.

1,238,249.   Specification of Letters Patent.   Patented Aug. 28, 1917.

Application filed December 11, 1916.   Serial No. 136,287.

*To all whom it may concern:*

Be it known that I, SHERMAN S. BENSON, a citizen of the United States, residing at York, in the county of York and State of Nebraska, have invented a new and useful Air-Pressure Gage, of which the following is a specification.

The present invention appertains to air pressure gages, and aims to provide a novel and improved device of that character for use upon the valve stems of pneumatic tires for automatically indicating the pressure of the air in the tires.

It is the object of the invention to provide an air pressure gage of novel construction for application to the valve stem of a pneumatic tire, the device preferably remaining permanently upon the valve stem, and being of such construction as to indicate the air pressure and also enabling the tire to be inflated and deflated in order that the desired pressure can be had.

A further object of the invention is the provision of an air pressure gage embodying a unique assemblage of the component elements, the device being simple and inexpensive in construction, and being thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a median section of the device, portions being shown in elevation.

Fig. 2 is an end view of the device.

In the drawing, there is illustrated an ordinary threaded valve stem 1 having the reduced threaded tip 2 as usual from which a pin 3 projects which in being pressed unseats the valve.

In carrying out the invention, a nut 4 is screwed upon the stem 1 and has a sleeve 5 loosely surrounding the stem and projecting toward the tip thereof to protect the stem from dirt, mud and other extraneous matter, and the nut 5 carries a gasket 6' to seat against the felly of the wheel for excluding foreign matter from the valve stem and the inner tube.

The body 6 of the device is preferably cast from suitable metal, and may be of any suitable construction. This body 6 is provided with a recess 7 telescopically receiving the sleeve 5, said sleeve and body being slidable and rotatable relative to one another and coöperating to exclude foreign matter from the valve stem. The body 6 has a counter bore 8 extending from the recess and threaded to screw onto the end of the valve stem 1. An annular gasket 9 is fitted within the counter bore 8 around the tip 2 of the stem to seat against the shoulder of the valve stem for preventing leakage when the body is screwed tight. The body 6 is provided coaxial with the recess 7 and counter bore 8 with a bore 10 for loosely receiving the tip 2 of the valve stem, and said bore 10 extends into a nipple 11 with which the body is provided projecting away from the recess 7.

A cap 12 is fitted upon the nipple 11 and has a central plug 13 therein fitting snugly within the nipple and provided with a neck 14 having a threaded head 15 screwed within the bore 10 and provided with a lug 16 projecting therefrom to contact with the pin 3 when the cap 12 is screwed downwardly sufficiently, whereby the valve within the stem 1 can be unseated. Said valve is released when the cap 12 is unscrewed. An annular gasket 17 is fitted within the annular space between the plug 13 and the rim of the cap 12 to seat against the end of the nipple 11 for preventing leakage when the cap 12 is screwed downwardly to unseat the valve within the stem 1.

The body 6 is provided parallel with the recess 7, counter bore 8 and bore 10 with a bore 18 extending to that end of the body 6 to which the recess 7 extends, the body having a by-pass or passage 19 communicating with the bore 10 between the nipple 2 and head 15 and communicating with the corresponding end of the bore 18. The body 6 has a nipple 20 projecting in the same direction as the nipple 11 at one side thereof, and said nipple has a bore 22 communicating with the bore 18. The cap 21 which is ordinarily threaded upon the tip 2 is in this case threaded upon the nipple 20, having been removed from the valve stem to which the present device is applied. There is a shoulder 23 at the inner end of the bore 22, and a tubular member 24 projects longitudinally from within the bore 22 into the bore 18 and has an enlargement 25 at one end seating against the shoulder 23. The tubular member 24 incloses a valve 26 similar to the valve used in the valve stem 1, and a valve seat member 27 is fitted within the nipple 20 for the seating of the valve 26 to prevent the escape of air. A pin 28 extends through the member 27 for unseating the valve 26 when the pin is pressed, and a member 29 within the cap 21 is adapted to contact with the pin 28 when the cap 21 is screwed tight, for unseating said valve 26 when desired. The projecting or free end of the tubular member 24 communicates with the bore 18 and is therefore in communication with the passage 19, so that when it is desired to inflate the tire, the cap 12 is screwed tight to push the pin 3 and unseat the valve within the stem 1, and by removing the cap 21, a pump can be connected to the nipple 20 for forcing air through the nipple 20 into the tubular member 24, and thence through the bore 18 and passage 19 into the bore 10 from which the air will flow through the valve stem 1 into the tire, the valve 26 seating to prevent the escape of air. The cap 12 can be unscrewed whenever desired to release the valve within the stem 1, and when the pin 3 is pushed down and the pin 28 pushed likewise, the air can escape from the tire for deflating it.

In order to indicate the pressure of the air, a tubular plunger 30 is disposed slidably within the bore 18, its upper or innermost end being offset or enlarged, as at 31, to fit the wall of the bore 18, whereby the air will force the plunger outwardly from the bore 18, any suitable means being provided for preventing leakage between the portion 31 and walls of the bore 18. A ring 32 is threaded within the open end of the bore 18 and the plunger 30 slides snugly through said ring, said ring being provided with a flange 33 seating against the body 6, and a disk 34 is secured to the projecting end of the plunger 30 to close it, and said disk has its marginal portion projecting to seat against the flange 33. The plunger 30 is provided with a series of graduations 35 which in being exposed will indicate the pressure automatically. A coiled wire expansion spring 36 surrounds the plunger 30 within the bore 18 and is confined between the ring 32 and enlarged portion 31, and said spring tends to resist the movement of the plunger 30 by the air pressure, the plunger being projected an amount proportional to the air pressure due to the presence of the spring 36. The greater the air pressure, the further will the plunger 30 be projected to expose the graduations 35 in succession. Supposing that the valve 26 is closed, then by screwing the cap 12 down to push the pin 3, the air can escape from the tire into the bore 18 to project the plunger 30 for indicating the pressure, and when air is forced into the tire, the air will flow from the tubular member or nozzle 24 into the tubular or hollow plunger 30 to project it, and the air will flow from the plunger through the passage 19 into the valve stem.

The member 27 can fit into the enlarged end 25 of the tubular member 24 for holding said tubular member firmly in place. The member 24 in projecting within the plunger 30 provides for the compact assemblage of the corresponding elements, and the structure is otherwise compact and desirable.

Having thus described the invention, what is claimed as new is:

A pressure gage embodying a body having two bores, one having a shoulder adjacent to the other, the body having a passage communicating with the second mentioned bore at that end adjacent to the first mentioned bore, a ring secured to the body at the other end of the second mentioned bore, a hollow plunger slidable through said ring within the second mentioned bore and having an enlargement at that end nearest said passage, an expansion spring between said ring and enlargement, a tubular member insertible and removable through the first mentioned bore and having a portion at one end seating against said shoulder, the other end of said tubular member projecting into the second mentioned bore and plunger, a valve seat member engaged within the first mentioned bore and first mentioned end of said tubular member to hold it seated against said shoulder, and a spring pressed valve within the tubular member seatable toward said valve seat member.

In testimony that I claim the foregoing as my own, I have hereto affixed my signature in the presence of two witnesses.

SHERMAN S. BENSON.

Witnesses:
BENTON PERRY,
J. E. SHRIGLEY.